No. 813,469. PATENTED FEB. 27, 1906.
N. WARNER & G. W. JACOBS.
EMERGENCY CAR COUPLING.
APPLICATION FILED FEB. 9, 1905.

Witnesses:
Jas. E. Hutchinson.
F. R. Fitton.

Inventors:
Norman Warner
George W. Jacobs
By William H. Hall, Attorney.

UNITED STATES PATENT OFFICE.

NORMAN WARNER AND GEORGE W. JACOBS, OF GLENNS FERRY, IDAHO.

EMERGENCY CAR-COUPLING.

No. 813,469.      Specification of Letters Patent.      Patented Feb. 27, 1906.

Application filed February 9, 1905. Serial No. 244,989.

*To all whom it may concern:*

Be it known that we, NORMAN WARNER and GEORGE W. JACOBS, citizens of the United States, residing at Glenns Ferry, in the county of Elmore and State of Idaho, have invented certain new and useful Improvements in Emergency Car-Couplers, of which the following is a specification.

Our invention relates to emergency car-couplers, primarily intended to be brought into service in case of breakage of the ordinary or usual coupling mechanism.

The object of the invention is to provide an emergency-coupler which is particularly simple in construction and highly desirable and efficient in use, and which, under ordinary conditions forms no part of the car-rigging, but which in the event of breakage of the ordinary coupling mechanism may be quickly placed in operative position and constitute a most efficient and effective coupler between the ordinary companion coupler heads or bodies associated with the cars to be connected.

The invention includes the parts and the combination and arrangement of component parts to be hereinafter described, and particularly pointed out in the claims.

The invention is susceptible of various embodiments, and a preferable exemplification thereof is illustrated in the accompanying drawings, in which—

Figure 1:
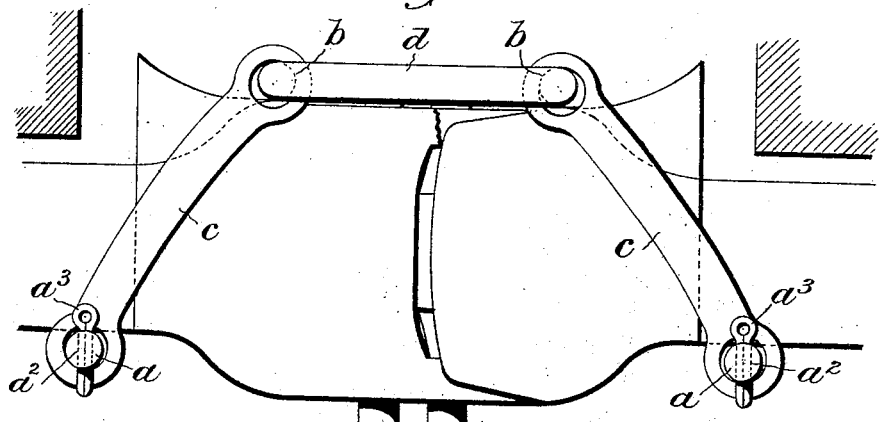
Figure 2:
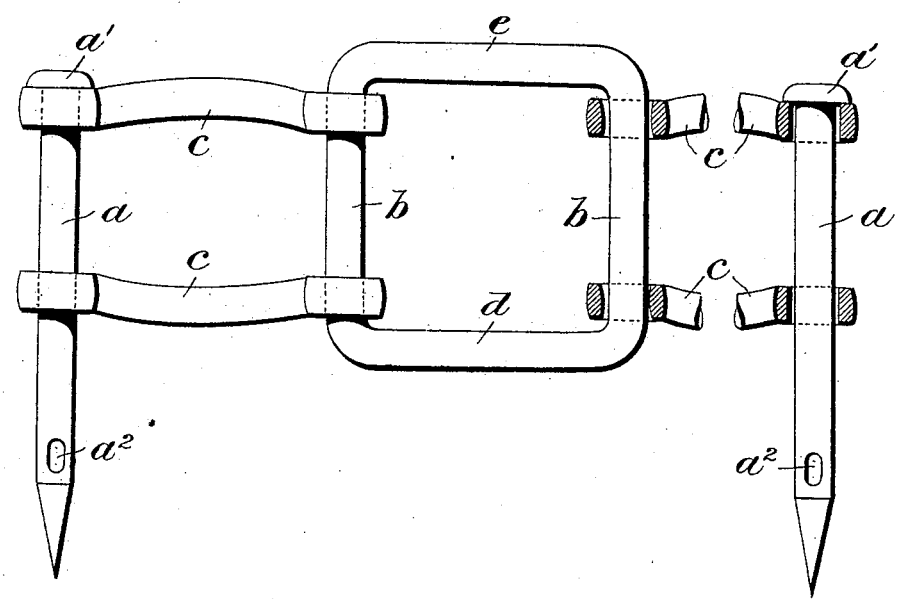

Figure 1 shows the invention in side elevation applied to companion coupling-heads, one of which is broken; and Fig. 2 is a plan view of the coupler with the parts spread out or in the same plane, certain of the parts being broken away to better show their construction.

The invention includes generally a coupling frame or chain comprising duplicate engaging parts for engaging, respectively, with like parts of the ordinary draft-beam or head of opposing coupling mechanisms and means for coupling said duplicate engaging parts together. In the particular exemplification of our invention illustrated in the accompanying drawings the duplicate engaging parts each includes a bearing-bar $a$, designed to engage with one side of a draft-beam or head, preferably to the rear of the ordinary enlargement of the latter, a second bar $b$, extending substantially in parallelism with the first and intended to bear on the opposite side of the beam or head, and links $c$, connecting the bars $a$ $b$ and designed to lie parallel with or abut against the sides of the beam or head, disposed at angles to the first-named sides. The means for coupling the engaging parts together in the illustrated embodiment of the invention comprises links $d$ $e$, shown herein as constituting integral continuations of the two bars $b$ and forming therewith a single substantially rectangular link or frame.

As shown in the drawings, the links $c$ are slightly bowed to conform to the sides of the beam-heads and are provided at their inner ends with eyes, through which the bars $b$ extend with a somewhat loose fit, so as to allow of the parts having limited relative lateral movement. The outer ends of the links $c$ are also provided with eyes, through which the bars $a$ extend, and the latter are preferably so constructed as to be readily disengaged from and engaged with the links $c$ in order to provide for the ready application of the emergency-coupler in case of accident. As here shown, each bar $a$ is provided with a head $a'$ at one end, designed to limit its movement in one direction by abutting against the adjacent link $c$, and contiguous to its opposite end is provided with a transverse opening $a^2$ for the reception of a removable cotter-pin $a^3$, which when in place limits the movement of the bar in a reverse direction by coming in contact with the companion link $c$. The last-named ends of the bars $a$ may be pointed or tapered to provide for the easy threading of the same through the eyes in the link $c$.

In case of breakage of the ordinary couplers, which renders them inoperative, our emergency-coupler is intended to be brought into service, as before premised. In applying the device it is only necessary to remove the bearing-bars $a$ and after the parts have been arranged substantially as shown in Figs. 1 and 2 to replace the bars $a$ and secure them in place by the cotter-pins $a^3$.

The construction and operation of our invention will be readily understood upon reference to the foregoing description and the accompanying drawings, and it will be appreciated that the parts and combinations recited may be varied within a wide range without departing from the spirit and scope thereof.

Having thus described our invention, what is claimed as new, and desired to be secured by Letters Patent, is—

1. An emergency-coupler, comprising a rectangular member arranged above the coupler-heads, and engaging members depending from opposite sides of the rectangular member and coacting with said heads.

2. An emergency-coupler, comprising a rectangular link designed to extend across contiguous ends of companion coupling-heads, and engaging members pivotally connected to opposite sides of said link and coacting with the heads.

3. An emergency-coupler, comprising a rectangular link, and duplicate engaging members designed to extend at angles to said link when the coupler is in operative position and designed to fold down upon the link when the coupler is out of operation.

4. An emergency-coupler, comprising duplicate engaging parts, each including inner bearing-bars, outer bearing-bars, and links connecting the inner bars to the outer bars, and links for connecting the inner bar of one engaging part to the inner bar of the companion engaging part.

5. An emergency-coupler, comprising duplicate engaging parts, each including inner bearing-bars, outer bearing-bars, and links connecting the inner bars to the outer bars, and links for connecting the inner bar of one engaging part to the inner bar of the companion engaging part, the latter links constituting integral continuations of the inner bars.

6. An emergency-coupler, comprising duplicate engaging parts, each of said parts including an inner bearing-bar, links having openings at their inner ends for said bar and openings at their opposite ends, and an outer bearing-bar removably held in the latter openings, and links for connecting the inner bearing-bars of companion engaging parts.

In testimony whereof we have hereunto signed our names, in the presence of two attesting witnesses, at Glenns Ferry, in the county of Elmore and State of Idaho, this 30th day of January, 1905.

NORMAN WARNER.
GEORGE W. JACOBS.

Witnesses:
IRA BLACK,
DELL B. WARNER.